United States Patent
Bornemann et al.

(10) Patent No.: US 6,539,313 B1
(45) Date of Patent: Mar. 25, 2003

(54) MONITORING PROCEDURE AND A MONITORING INSTALLATION FOR NUMERICALLY CONTROLLED MACHINE TOOLS

(75) Inventors: Armin Bornemann, Marktoberdorf (DE); Reinhold Seitz, Hopferau (DE)

(73) Assignee: Deckel Maho Pfronten GmbH, Pfronten (DE)

(*) Notice: Subject to any disclaimer, the term of this patent is extended or adjusted under 35 U.S.C. 154(b) by 45 days.

(21) Appl. No.: 09/666,578

(22) Filed: Sep. 21, 2000

(30) Foreign Application Priority Data

Sep. 22, 1999 (DE) ......................................... 199 45 395

(51) Int. Cl.[7] .................................................. G01B 3/00
(52) U.S. Cl. ............................. 702/33; 700/90; 700/95; 700/159; 408/10; 408/11
(58) Field of Search ............................... 702/33; 700/95, 700/117, 159; 318/567, 569, 570, 571, 590, 276; 408/11, 10

(56) References Cited

U.S. PATENT DOCUMENTS

| | | | | |
|---|---|---|---|---|
| 4,297,624 A | * | 10/1981 | Komiya | ...................... 318/590 |
| 4,374,350 A | * | 2/1983 | Kohzai et al. | ............... 318/590 |
| 4,985,841 A | * | 1/1991 | Iwagaya | ....................... 408/11 |
| 6,040,666 A | * | 3/2000 | Honda et al. | ................ 318/276 |

* cited by examiner

Primary Examiner—John Barlow
Assistant Examiner—Hien Vo
(74) Attorney, Agent, or Firm—The Maxham Firm

(57) ABSTRACT

A monitoring procedure and a monitoring installation for machine tools with a motor-driven work spindle and a separate protection device. The actual mass inertia moment of a tool fitted into the work spindle is determined by measurement and compared with a mass inertia moment calculated from the data of the tool. In addition, a predetermined parameter of a tool fitted into the work spindle is compared with that of the maximum parameter for the tool which is dependent on the strength of the protection device. The work spindle will be driven at the predetermined desired speed of rotation only if the actual mass inertia moment agrees with the calculated mass inertia moment and the predetermined parameter is smaller than or equal to the maximum parameter predetermined by the strength of the protection device.

20 Claims, 6 Drawing Sheets

MONITORING PROCEDURE AND A MONITORING INSTALLATION FOR NUMERICALLY CONTROLLED MACHINE TOOLS

BACKGROUND

1. Field of the Invention

The invention concerns a monitoring procedure and a monitoring installation for numerically-controlled machine tools with a motor-rotated work spindle and a separating protection device.

2. Discussion of Related Art

For the protection of the operator, numerically controlled machine tools are as a rule, equipped with partitions or protective booths which are intended to prevent potential danger to the operator from flying tools, work or fragments. It is, however, the inspection windows of such partitions or protective booths which are of a limited strength. Since protective devices must often be mobile, their thickness also has limits. Due to incorrect programming or faulty operation of the machine tools, operating conditions may intervene which can lead to danger for operators. Thus, for example, a replaceable bezel of a milling cutter may, in the event of a fracture due to incorrect programming or incorrect input of the rotational speed, fly away from the tool holder with such high energy that the separating protection devices cannot withstand the impact.

SUMMARY OF THE INVENTION

It is a primary purpose of the present invention to provide a monitoring procedure and a monitoring installation for machine tools which make possible an improvement in machine safety.

According to the invention, the actual mass inertia moment of a tool held in the work spindle is determined on the basis of a measurement and compared with a mass inertia moment calculated from the predetermined data for the tool in question. In this way it is possible to verify whether the geometrical tool data entered into the NC control agree with the data of the tool fitted into the work spindle or whether, for instance, erroneous diameter values were entered or programmed. By comparing a predetermined parameter of the fitted tool with the maximum parameter which depends on the strength of the separating protective device with the chosen processing data, it is possible to determine whether the safety device could withstand a possible collision with flying parts. Rotation of the work spindle will only take place at the desired speed of rotation, if the actual mass inertia moment agrees with the calculated mass inertia moment and the predetermined parameter is smaller than or equal to the predetermined maximum parameter predetermined by the strength of the protection device. In this way it is possible to identify an erroneous tool diameter and speed of rotation entry, and the speed of rotation of the work spindle can be restricted to an admissible value or the work spindle can be stopped and an error message issued.

Thus, for example, the predetermined parameter can advantageously be the entered tool diameter, which is compared with a maximum diameter dependent on the programmed speed of rotation. The predetermined parameter can, however, also be the entered desired speed of rotation of the work spindle, which is compared with a maximum speed of rotation dependent on the tool diameter.

In the event of a divergence between the actual mass inertia moment and the calculated mass inertia moment, or if the maximum parameter is exceeded, or both, it is advantageous to stop the work spindle drive or for an error message to be issued, or both. The speed of rotation of the work spindle can also be reduced to an admissible value.

The actual mass inertia moment of the tool fitted into work spindle can be calculated particularly easily on the basis of the acceleration time which is measured during the acceleration of the rotation speed of the tool to a predetermined reference value. If the machine tool possesses, for example, a mechanical or an optical system for determining the measurements of the tool fitted into the work spindle, the actual mass inertia moment can also be calculated from the tool data determined as set out above and compared with the mass inertia moment calculated from the entered values of the mass inertia moment. The actual mass inertia moment can also be calculated by either method, with a resulting greater degree of reliability.

In a further advantageous embodiment of the present invention, the work spindle is first accelerated to the predetermined reference speed of rotation while the current uptake of the drive motor is measured. By comparing the current uptake with a reference value obtained during the acceleration of a work spindle without a tool fitted, it is possible to verify whether a tool has been fitted into the work spindle. If this is not the case, the drive can be stopped and an error message issued.

A further advantageous embodiment is characterized by the fact that the work spindle will be driven at the predetermined desired speed of rotation only if an imbalance measured during the acceleration of the speed of rotation of the work spindle to a predetermined measured speed of rotation reference value is below a maximum admissible imbalance.

BRIEF DESCRIPTION OF THE DRAWING

The objects, advantages, and features of the present invention will be more clearly perceived from the following detailed description, when read in conjunction with the accompanying drawing, in which.

DETAILED DESCRIPTION OF THE PREFERRED EMBODIMENTS

FIGS. 1 to 4 show the individual processes of automatic monitoring which can, for example, be carried out in the case of a numerically controlled universal milling and drilling machine with an automatic tool changing device and a protection booth, both with NC operation 100 and with manually controlled operation 200.

Figure 1:
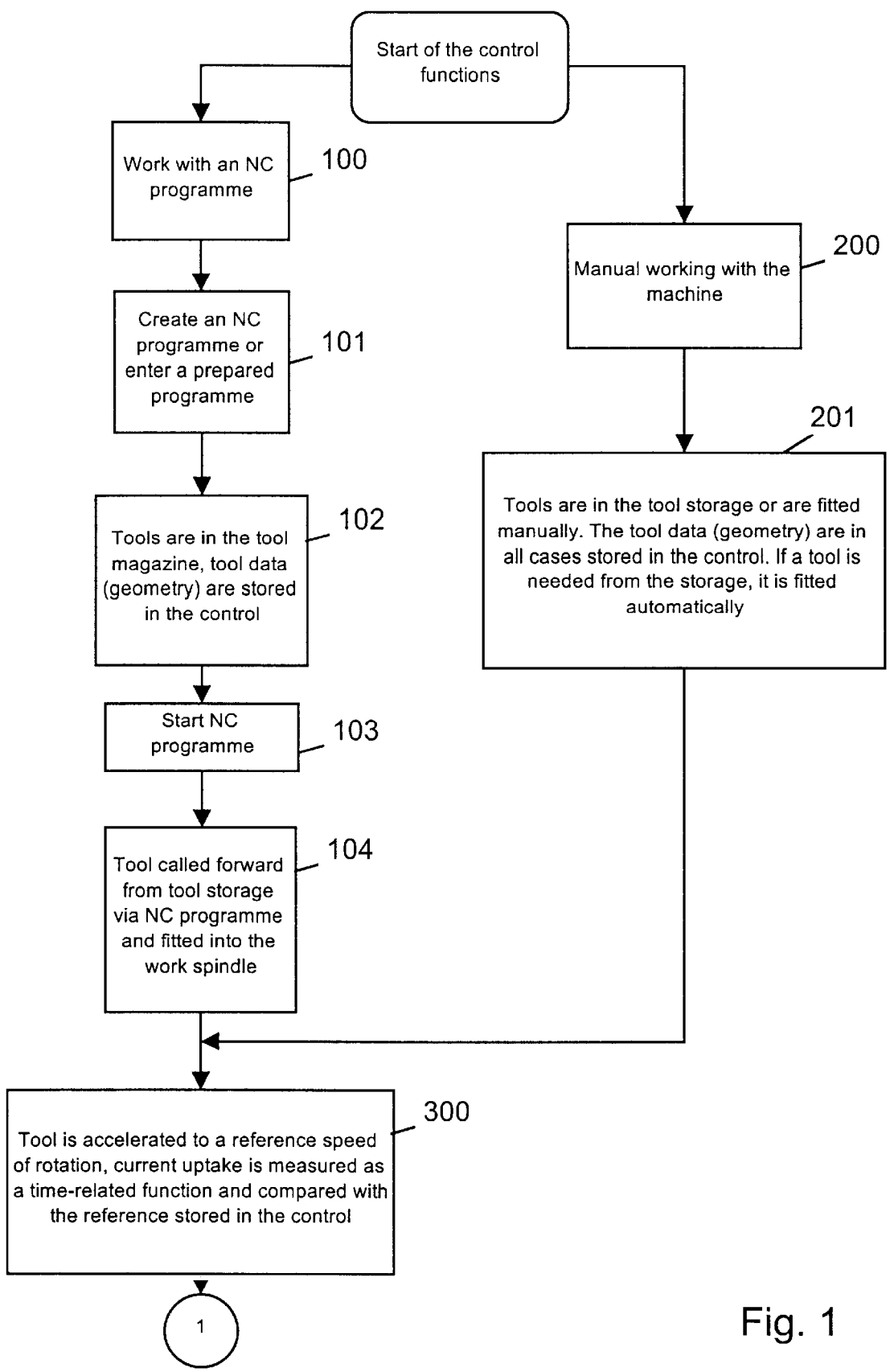
FIGS. 1 to 4 are functional flow charts which, together, describe the monitoring procedure according to the invention.

As FIG. 1 shows, NC program input 100 and input 101 of the NC program take place through direct programming on the machine or through the entry of an already prepared program into an NC control. At the same time, storage 102 is carried out of geometrical tool data of tools located in the tool storage. Following start 103 of the NC program, a tool change 104 is carried out by means of corresponding activation of the automatic tool changing device to introduce the required tool into the work spindle. Equally, in the case of manually operated operation 200, the geometrical data of the tools located in the tool storage or manually inserted are stored in the NC control. By means of a corresponding control command given by the operator, an automatic tool change 201 takes place and the required tool is introduced into the work spindle.

After the completion of a tool change which has been initiated either by means of the NC program or the tool change procedure 104 or 201 by the operator, the work spindle is accelerated to the reference speed of rotation by step 300. Current uptake by the drive motor is measured as a time-related function and compared with a reference curve for the acceleration of the work spindle without a tool fitted, which is stored in the control of the machine tool.

Figure 5:
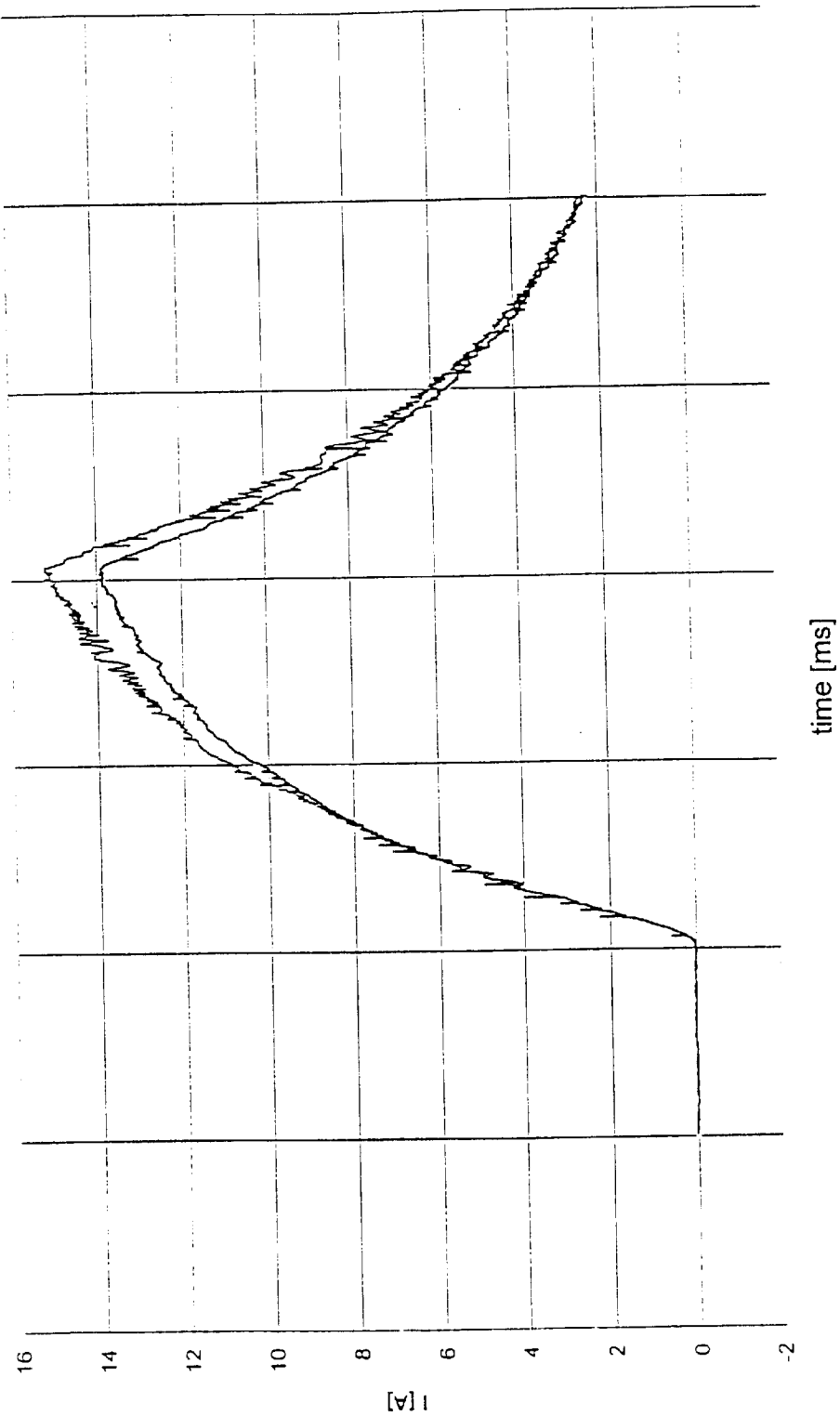
FIG. 5 shows a typical flow of the current by a drive motor during the acceleration of a work spindle with and without a tool fitted.

FIG. 5 shows a typical flow of current during the acceleration of the working spindle with and without a tool fitted. The lower curve which appears in FIG. 5 shows current uptake during the acceleration of the work spindle without a tool fitted. This curve can be stored in the control as a reference curve. On the other hand, the upper curve shown in FIG. 5 shows the flow of current during the acceleration of the working spindle with a tool fitted.

By comparing an actually determined acceleration curve with the reference curve stored in the control, it is then possible to verify whether a tool has been fitted into the work spindle.

Figure 2:
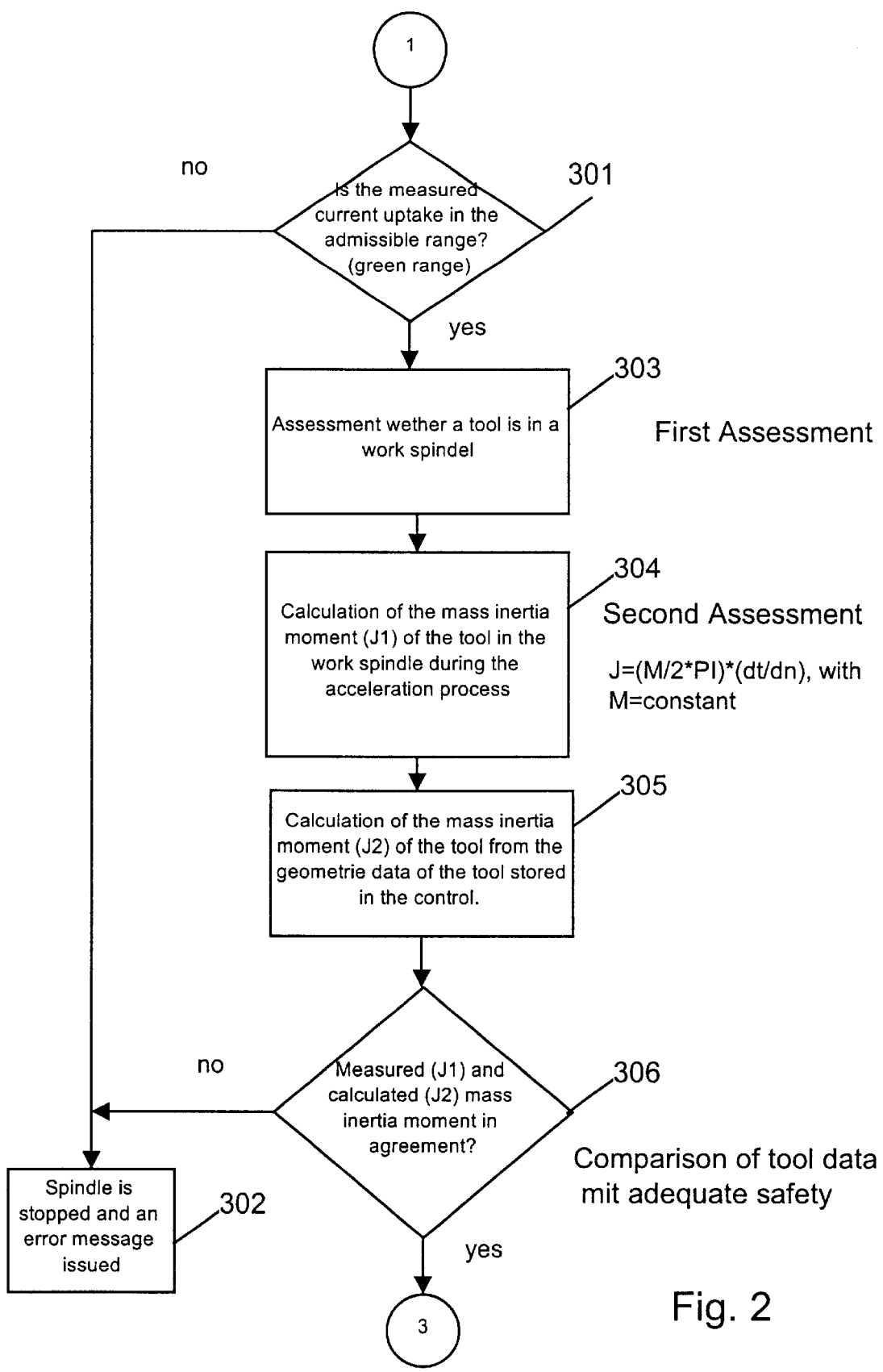

If, for example, a verification carried out in step 301 according to FIG. 2 shows that the flow of current measured in step 300 does not lie within an admissible range above the reference curve, it is assumed that no tool has been fitted into the work spindle and the drive of the work spindle is then stopped by step 302 and an error message is issued. When, however, the measured uptake of current is within the admissible range, it is assumed by means of a step 303 first assessment that a tool has been fitted into the work spindle.

In a further step 304, the actual mass inertia moment $J_1$ of the tool fitted into the work spindle is calculated on the basis of the value measured during the acceleration of the work spindle. Using the formula:

$$M = J_{ges} \times 2\pi \cdot dn/dt \qquad \text{(Eq. 1)}$$

it is, for example, possible to calculate the total mass inertia moment $J_{ges}$ by means of a measured acceleration time t in the course of the acceleration of the tool to a predetermined reference value n at a constant motor moment M.

The total mass inertia moment $J_{ges}$ consists, in accordance with the following formula $$J_{ges} = J_M + J_s + J_1 + J_{sp} + \qquad \text{(Eq. 2)}$$

of the sum of the motor inertia moment $J_M$, the spindle inertia moment $J_s$, the tool inertia moment $J_1$ and the inertia moments of the further masses to be accelerated, such as, for example, the tool tension jack and the like. Therefore it is possible to calculate the actual inertia moment $J_1$ of the tool fitted into the work spindle by means of subtracting the known values of the motor inertia moment $J_M$, the spindle inertia moment $J_s$, and, so on, from the measured total inertia moment $J_{ges}$.

In a further step 305, a mass inertia moment $J_2$ is calculated from the geometrical data of the tool fitted into the work spindle which are stored in the NC control and compared in a further step 306, with the mass inertia moment $J_1$ determined in step 304. If the mass inertia moments $J_1$ and $J_2$ differ from one another, then the drive of the work spindle is stopped by step 302 and an error message issued.

Figure 3:
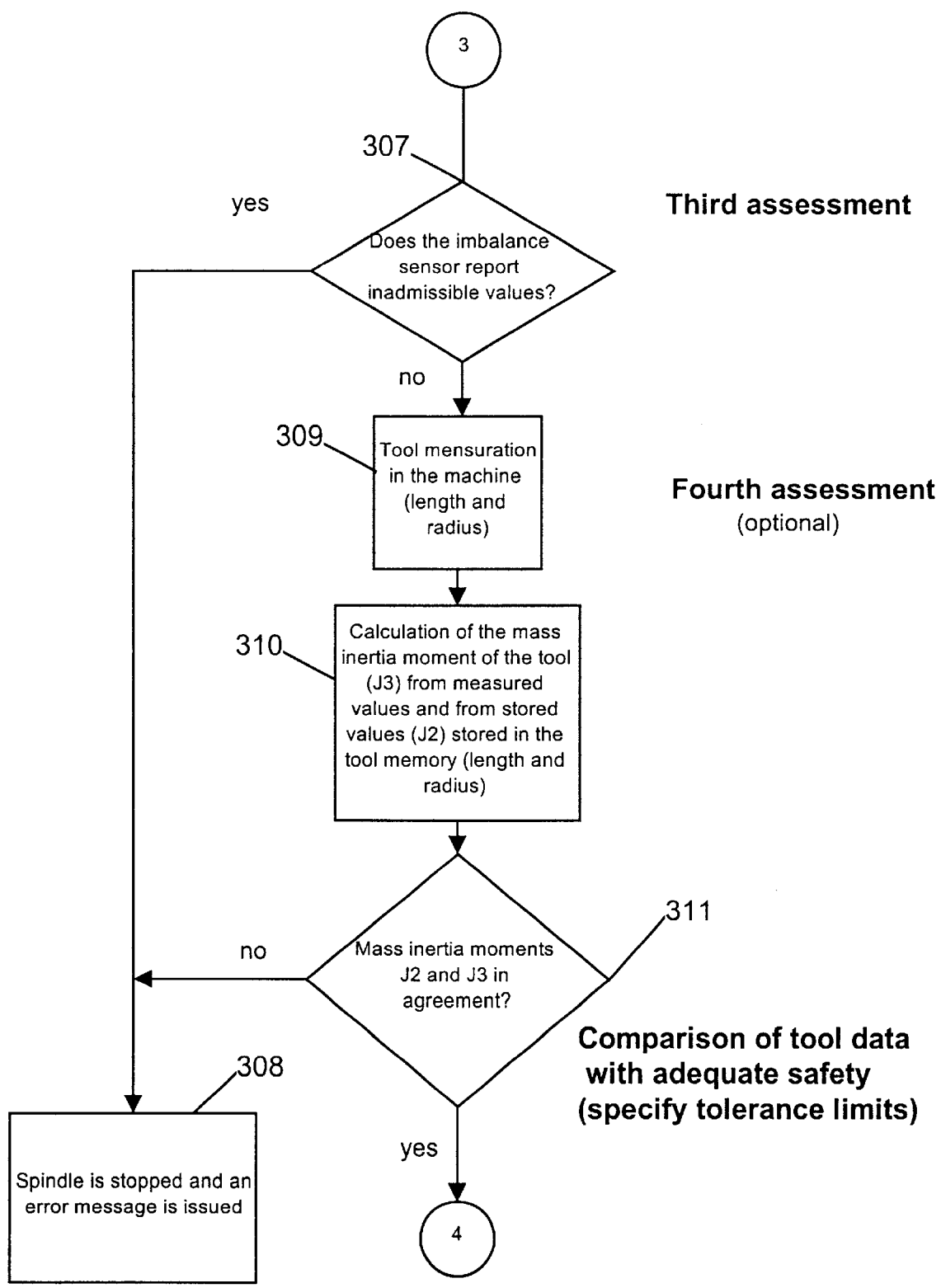

If the mass inertia moments $J_1$ and $J_2$ agree with one another, then, as is shown in FIG. 3, the imbalance of the tool which is fitted into the work spindle is verified in step 307 which follows. This can be carried out by means of a knock sensor of the type used in motor vehicles. When the measured imbalance exceeds a maximum admissible value, the work spindle is stopped in the next step 308 and an error message is issued. If, however, the measured imbalance lies within the admissible range, the verification continues.

In the case of machine tools which posses a separate installation for the mechanical or optical mensuration of tools, an additional further safety verification can be carried out. In the course of this procedure, a mass inertia moment $J_3$ is calculated in step 310 from the tool data determined by the mensuration 309 of the data and compared, in a further step 311, with the mass inertia moment $J_2$ which had been calculated in step 305 from the tool data stored in the NC control. In the event of a divergence between the respective mass inertia moments $J_2$ and $J_3$, the work spindle is stopped by step 308 and an error message is issued.

Figure 4:
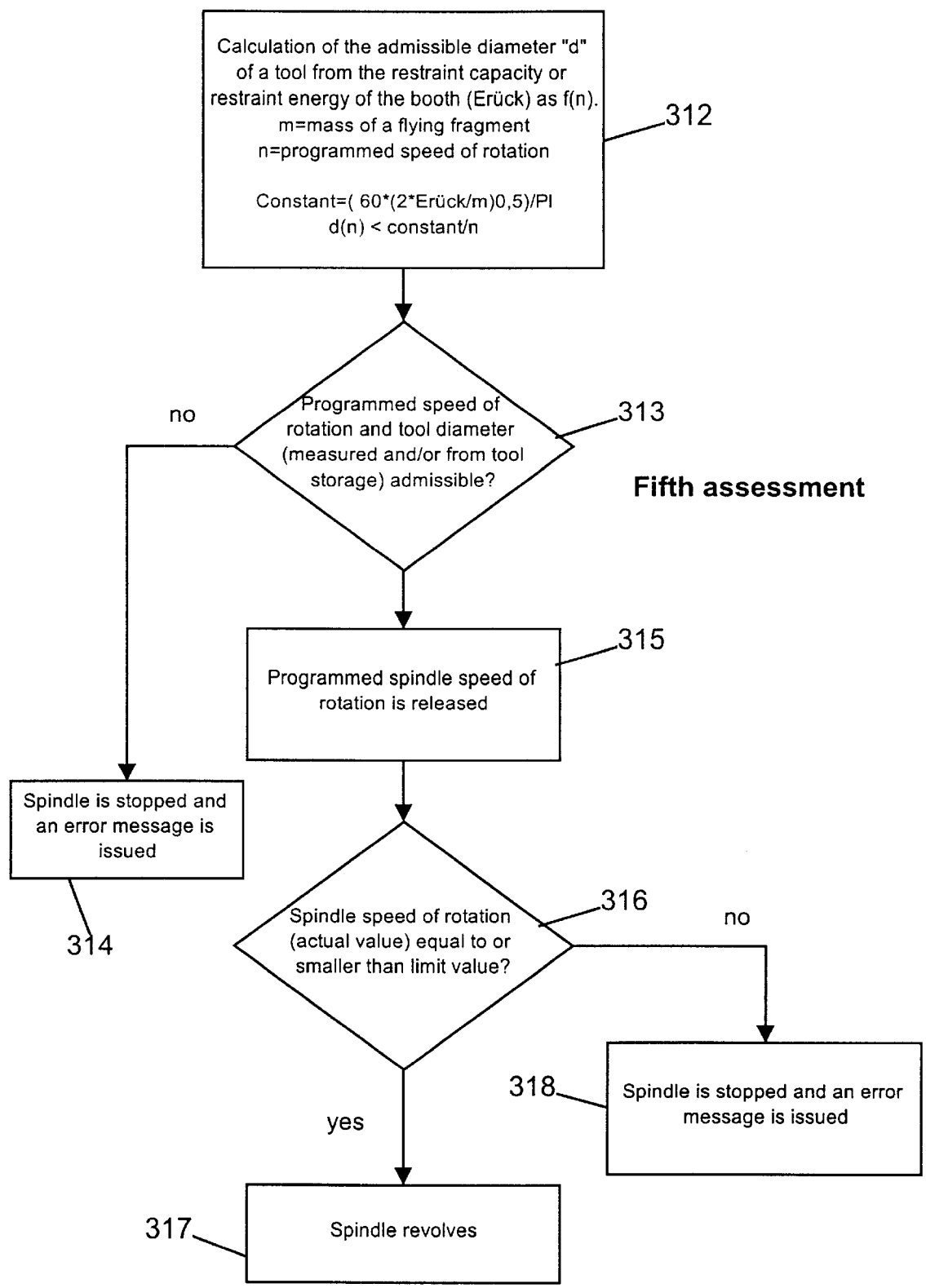

If the mass inertia moments $J_2$ and $J_3$ agree with one another, then, as is shown in FIG. 4, in a next step 312 the maximum admissible diameter $d_{max}$ of the tool from the restraint capacity or restraint energy $E_{rück}$ of the protection booth is calculated as a function of the rate of rotation, it being assumed that the protection booth can absorb a certain amount of energy without fracturing. This energy can be determined by means of shot trials using a predetermined projectile.

Thus, for example, inspection windows of 12-mm thick polycarbonate sheet can absorb a dose of energy of some 1100 Nm. If a loss of strength resulting from the aging of the material is taken into account, a maximum restraint energy of 500 Nm can be assumed for polycarbonate sheet. This maximum restraint energy yields the following formula for the calculation of the relationship between the tool diameter and the revolution rate n of the work spindle.

$$d < 60 \cdot (2E_{rück}])^{0.5} \cdot 1 \ \pi(m)n \qquad \text{(Eq. 3)}$$

Assuming that the mass m of a flying part is 0.1 kg, the maximum admissible tool diameter $d_{max}$ for the programmed desired speed of rotation, $n_{soll}$ can be calculated.

Figure 6:
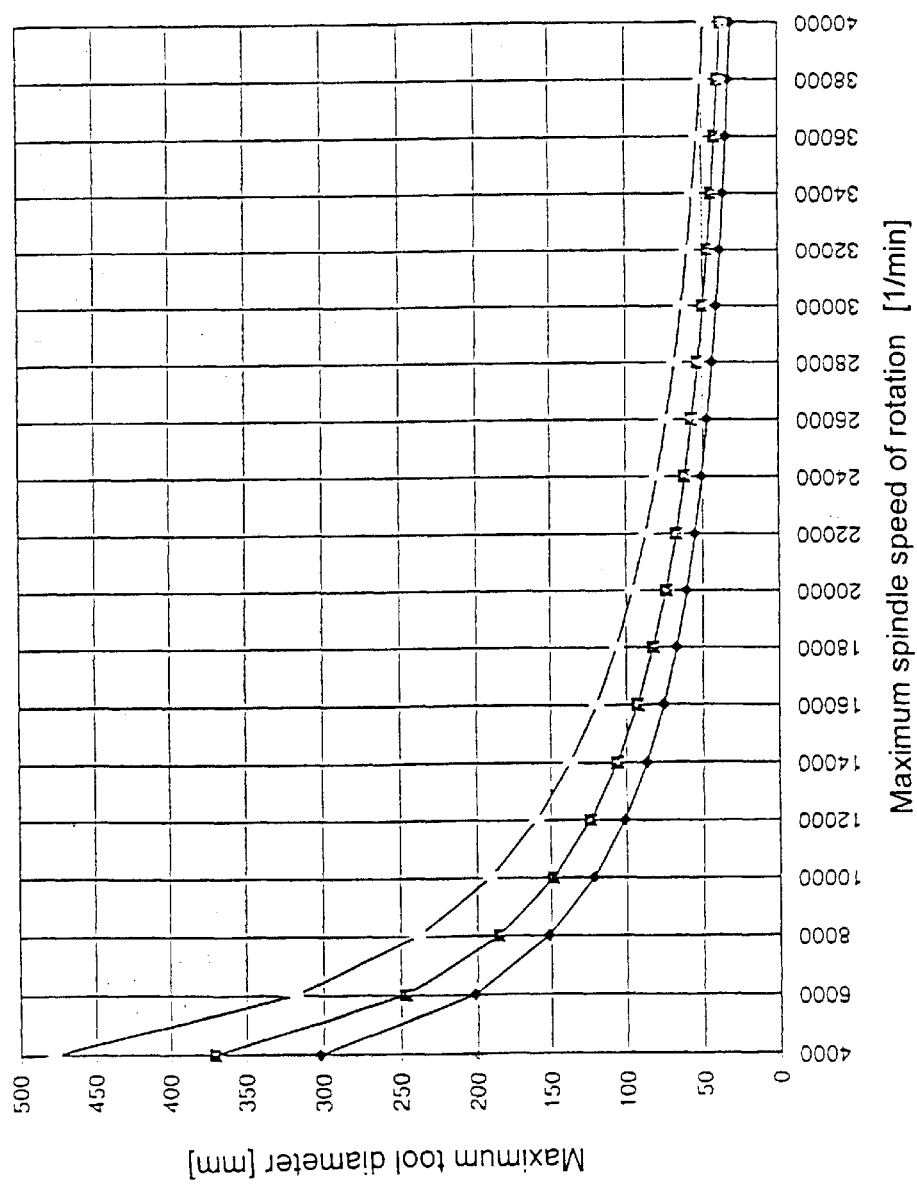
FIG. 6 is a diagram of the relation between the maximum admissible tool diameter and the maximum admissible speed of rotation of the work spindle as a function of the restraint capacity of a separating protection device.

FIG. 6 shows the relationship between the maximum admissible tool diameter and the maximum speed of rotation of the spindle for different restraint energies under the action of a standard shot of 0.1 kg.

The maximum diameter $d_{max}$ calculated in step 312 is compared in the next step 313 with the measured or stored tool diameter, or both. When the measured or stored tool diameter exceeds the admissible maximum, the work spindle is stopped in the next step 314 and an error message is issued. Otherwise, the programmed speed of rotation $n_{soll}$ is released in step 315.

From the immediately preceding relationship, it is however also possible to determine in the same way a maximum speed of rotation of the work spindle for a given tool diameter and to compare it with the programmed speed of rotation.

If the programmed speed of rotation $n_{soll}$ is released, it is then possible to verify in a further step 316 whether it is under, for example, a predetermined limiting value as a result of storage. If this is the case, the work spindle is activated at the programmed speed of rotation in step 317. Otherwise, the work spindle is stopped in step 318 and an error message is issued.

By means of the verification according to the invention, it is possible to detect an erroneous entry of the tool diameter or the speed of rotation, or both, and to prevent a resulting potential danger to the machine operator.

What is claimed is:

1. A monitoring process for machine tools with a motor-driven work spindle and a separate protection device, the process comprising:
    determining the actual mass inertia moment of a tool fitted into the work spindle on the basis of a measurement and compared with a mass inertia moment calculated from predetermined mass inertia moment of the tool;
    comparing a predetermined parameter for the tool fitted into the work spindle with a maximum parameter dependent on the strength of the protection device for this tool; and
    activating the work spindle at the preset reference revolution rate only if the actual mass inertia moment agrees with the calculated mass inertia moment and the predetermined parameter is smaller than or equal to the maximum parameter predetermined by the strength of the protection device.

2. The monitoring process according to claim 1, wherein the predetermined parameter of the tool diameter is compared with that of the maximum diameter predetermined for the programmed speed of rotation.

3. The monitoring process according to claim 1, wherein the predetermined parameter is the desired speed of rotation of the work spindle which is compared with a maximum speed of rotation dependent on the tool diameter.

4. The monitoring process according to one of claims 1 to 3, wherein in the event of a divergence between the actual mass inertia moment and the calculated mass inertia moment and/or in the event of the maximum parameter being exceeded, the drive of the work spindle is stopped and/or an error message is issued.

5. The monitoring process according to one of claims 1 to 3, wherein the actual mass inertia moment of the tool fitted into the work spindle is determined on the basis of the acceleration time measured during the acceleration of the tool to a predetermined speed of rotation.

6. The monitoring process according to claim 4, wherein the actual mass inertia moment of the tool fitted into the work spindle is determined on the basis of the acceleration time measured during the acceleration of the tool to a predetermined speed of rotation.

7. The monitoring process according to one of claims 1 to 3, wherein the actual mass inertia moment of the tool fitted into the work spindle is determined on the basis of the tool dimensions obtained by measurement.

8. The monitoring process according to claim 4, wherein the actual mass inertia moment of the tool fitted into the work spindle is determined on the basis of the tool dimensions obtained by measurement.

9. The monitoring process according to one of claims 1 to 3, wherein the work spindle will only be activated to run at the desired speed of rotation if the measured uptake of current by the spindle drive during the acceleration of the work spindle to a predetermined reference rate of rotation lies above a reference curve which results during the acceleration of a work spindle without a tool fitted.

10. The monitoring process according to claim 4, wherein the work spindle will only be activated to run at the desired speed of rotation if the measured uptake of current by the spindle drive during the acceleration of the work spindle to a predetermined reference rate of rotation lies above a reference curve which results during the acceleration of a work spindle without a tool fitted.

11. The monitoring process according to claim 5, wherein the work spindle will only be activated to run at the desired speed of rotation if the measured uptake of current by the spindle drive during the acceleration of the work spindle to a predetermined reference rate of rotation lies above a reference curve which results during the acceleration of a work spindle without a tool fitted.

12. The monitoring process according to claim 7, wherein the work spindle will only be activated to run at the desired speed of rotation if the measured uptake of current by the spindle drive during the acceleration of the work spindle to a predetermined reference rate of rotation lies above a reference curve which results during the acceleration of a work spindle without a tool fitted.

13. The monitoring procedure according to one of claims 1 to 3, wherein the work spindle will only be driven at the present desired revolution rate if, during acceleration of the work spindle to a predetermined reference revolution rate, a measured imbalance lies under a maximum value of admissible imbalance.

14. The monitoring process according to claim 4, wherein the work spindle will only be driven at the present desired revolution rate if, during acceleration of the work spindle to a predetermined reference revolution rate, a measured imbalance lies under a maximum value of admissible imbalance.

15. The monitoring process according to claim 5, wherein the work spindle will only be driven at the present desired revolution rate if, during acceleration of the work spindle to a predetermined reference revolution rate, a measured imbalance lies under a maximum value of admissible imbalance.

16. The monitoring process according to claim 7, wherein the work spindle will only be driven at the present desired revolution rate if, during acceleration of the work spindle to a predetermined reference revolution rate, a measured imbalance lies under a maximum value of admissible imbalance.

17. The monitoring process according to claim 9, wherein the work spindle will only be driven at the present desired revolution rate if, during acceleration of the work spindle to a predetermined reference revolution rate, a measured imbalance lies under a maximum value of admissible imbalance.

18. A monitoring installation for machine tools with a motor-driven work spindle and a separate protection device, the installation comprising:
    a device for comparing the mass inertia moment of a tool fitted into the work spindle determined by measurement, with the mass inertia moment predetermined data calculated for the tool;
    a device for comparing a preset parameter of the tool fitted into the work spindle with a maximum parameter which is dependent on the strength of the protection device for the tool; and
    a device for the release of a predetermined desired speed of rotation of the work spindle when the actual mass inertia moment agrees with the calculated mass inertia moment and the predetermined parameter is greater than or equal to the maximum parameter predetermined by the strength of the protection device.

19. The monitoring installation according to claim 18, and further comprising a device for the determination of a time-related flow of the current uptake of a drive motor during acceleration to a predetermined reference speed of rotation.

20. The monitoring installation according to one of claims 18 or 19, and further comprising a device for the determination of an inadmissible imbalance of a tool fitted into the work spindle.

* * * * *